(12) United States Patent
Shinomiya

(10) Patent No.: US 8,650,333 B2
(45) Date of Patent: Feb. 11, 2014

(54) METHOD AND APPARATUS FOR DEVICE CONTROL SYSTEM FOR LOAD MONITORING BY PERFORMING TRANSMISSION OF STATE NOTIFICATION OF DEVICES INDIVIDUALLY

(75) Inventor: Hirotatsu Shinomiya, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/642,857

(22) PCT Filed: Apr. 22, 2011

(86) PCT No.: PCT/JP2011/059939
§ 371 (c)(1),
(2), (4) Date: Oct. 23, 2012

(87) PCT Pub. No.: WO2011/132774
PCT Pub. Date: Oct. 27, 2011

(65) Prior Publication Data
US 2013/0042026 A1   Feb. 14, 2013

(30) Foreign Application Priority Data

Apr. 23, 2010   (JP) ................................. 2010-100250

(51) Int. Cl.
*G08C 17/00* (2006.01)
*G06F 3/00* (2006.01)
(52) U.S. Cl.
USPC .................. 710/18; 710/15; 710/16; 710/17; 710/19; 370/254; 370/390
(58) Field of Classification Search
USPC .............. 710/15–19; 370/254, 390
See application file for complete search history.

(56) References Cited

U.S. PATENT DOCUMENTS 6,895,006 B1 * 5/2005 Tasaki et al. .................. 370/390
7,525,927 B2 * 4/2009 Sato et al. ..................... 370/254

(Continued)

FOREIGN PATENT DOCUMENTS

| JP | 03-250934 A | 11/1991 |
| JP | 10-051868 A | 2/1998 |
| JP | 2000-032046 A | 1/2000 |

OTHER PUBLICATIONS

International Search Report for corresponding International Application No. PCT/JP2011/059939 mailed Aug. 2, 2011.

(Continued)

*Primary Examiner* — Tammara Peyton
(74) *Attorney, Agent, or Firm* — Renner, Otto, Boisselle & Sklar, LLP

(57) ABSTRACT

An operation terminal 1 is configured so as to transmit, as a control command, an individual control command transmitted individually to a specific control device 2 of control devices 2, or a collective control command broadcasted collectively to two or more control devices 2 of control devices 2. Control terminal 2 comprises: a command determination unit 2d determining whether received control command is individual control command or collective control command; and an information processing unit 2b which, if received control command is individual control command, responds by collectively broadcasting to a plurality of operation terminals a state change notification corresponding to execution of individual control command, and, if received control command is collective control command, responds by collectively broadcasting to operation terminals 1, with a timing different from the other control terminals 2, a state change notification corresponding to execution of collective control command.

15 Claims, 9 Drawing Sheets

(56) References Cited

U.S. PATENT DOCUMENTS

| | | | |
|---|---|---|---|
| 7,660,894 B1 * | 2/2010 | Carrie | 709/225 |
| 8,046,769 B2 * | 10/2011 | Masuda et al. | 718/105 |
| 8,139,579 B2 * | 3/2012 | Tasaki et al. | 370/390 |
| 8,225,011 B2 * | 7/2012 | Soeda et al. | 710/18 |
| 2011/0302332 A1 * | 12/2011 | Soeda et al. | 710/18 |
| 2012/0166744 A1 * | 6/2012 | Yamashita et al. | 711/159 |

OTHER PUBLICATIONS

PCT/ISA/237 for corresponding International Application No. PCT/JP2011/059939 dated Aug. 2, 2011.

* cited by examiner

Fig. 2A
CONTROL COMMAND

| OPERATION CODE | ID | OID | PARAMETER |
|---|---|---|---|

Fig. 2B
PATTERN CONTROL COMMAND

| INVOKE | PATTERN CONTROL METHOD | BROADCAST ID | TERMINAL CIRCUIT ID1 | CONTROL CONTENT1 | TERMINAL CIRCUIT ID2 | CONTROL CONTENT2 | TERMINAL CIRCUIT ID3 | ID3 | ... |
|---|---|---|---|---|---|---|---|---|---|

Fig. 2C
GROUP CONTROL COMMAND

| INVOKE | GROUP CONTROL METHOD | BROADCAST ID | CONTROL CONTENT | TERMINAL CIRCUIT ID1 | ID1 | TERMINAL CIRCUIT ID2 | ID2 | TERMINAL CIRCUIT ID3 | ID3 | ... |
|---|---|---|---|---|---|---|---|---|---|---|

Fig. 2D
SINGLE CONTROL COMMAND

| INVOKE | INDIVIDUAL CONTROL METHOD | TERMINAL ID | CONTROL CONTENT |
|---|---|---|---|

Fig. 3

STATE CHANGE NOTIFICATION

| INVOKE | STATE NOTIFICATION METHOD | BROADCAST ID | CIRCUIT ID1 | CONTROL STATE1 | CIRCUIT ID2 | CONTROL STATE2 | CIRCUIT ID3 | CONTROL STATE3 | ····· |

Fig. 9A
PATTERN CONTROL COMMAND

| INVOKE | PATTERN CONTROL METHOD | BROADCAST ID | DYNAMIC TIME LIMIT | TERMINAL ID1 CIRCUIT ID1 | CONTROL CONTENT1 | TERMINAL ID2 CIRCUIT ID2 | CONTROL CONTENT2 | TERMINAL ID3 CIRCUIT ID3 | ... |

Fig. 9B
GROUP CONTROL COMMAND

| INVOKE | GROUP CONTROL METHOD | BROADCAST ID | DYNAMIC TIME LIMIT | CONTROL CONTENT | TERMINAL ID1 CIRCUIT ID1 | TERMINAL ID2 CIRCUIT ID2 | TERMINAL ID3 CIRCUIT ID3 | ... |

METHOD AND APPARATUS FOR DEVICE CONTROL SYSTEM FOR LOAD MONITORING BY PERFORMING TRANSMISSION OF STATE NOTIFICATION OF DEVICES INDIVIDUALLY

TECHNICAL FIELD

The invention relates to a device control system.

BACKGROUND ART

There has been a device control system, in which an operation terminal is connected to a network and multicasts or collectively broadcasts a control command to a plurality of control devices on the network, thereby controlling the plurality of control devices. The control command is a broadcast packet for indicating control contents to the plurality of control devices. Then, each control device responds by transmitting a state change notification, including a control state data, to the operation terminal, when a control state is changed by executing the received control command.

However, in the collectively broadcast, when the plurality of control devices respond by transmitting state change notifications at the same time, the packets of the state change notifications may collide with each other, in the case where the communication transport in the network is performed at low speed. Therefore, there is a possibility that the packet loss is generated and the operation terminal can not receive the state change notifications.

And so, a device control system as disclosed in Japanese Patent Application Publication No. 3-250934 has been proposed. First, when an operation terminal collectively broadcasts a control command to a plurality of control devices on a network, each control device executes the received control command. In this case, even if the control state is changed by the execution, each control device does not transmit the state change notification to the operation terminal. The operation terminal performs the unicast transmission of a state notification request command sequentially with respect to each of the plurality of control devices individually, after the broadcast of the control command. Each control device transmits the state change notification to the operation terminal, when receiving the state notification request command. That is, after the broadcast of the control command to the plurality of control devices, the operation terminal performs polling to each control device, thereby receiving the state change notification from each control device.

In the device control system as disclosed in the above document, the operation terminal has need to perform the unicast transmission of a state notification request command sequentially with respect to each of the control devices individually, after the broadcast of the control command. Therefore, the communication traffic on the network is increased.

Further, other operation terminals, except for the operation terminal that performs polling after the broadcast of the control command, can not receive the state change notification from each control device. Therefore, these operation terminals can not get the change information of the control state.

DISCLOSURE OF THE INVENTION

It is an object of the present invention to provide a device control system, in which all operation terminals can get the state changes of a plurality of control devices in the system, and further can receive a state change notification more certainly, when obtaining the state change notification from each of the plurality of control devices, and moreover can prevent a decrease in the communication efficiency.

A device control system of the present invention comprises a plurality of operation terminals connected to a network and a plurality of control devices connected to the network, and each operation terminal transmits a control command to the plurality of control devices, and each control device is controlled by executing the received control command and transmits a state change notification to the plurality of operation terminals when a control state is changed by the execution of the control command, and wherein each operation terminal is configured so as to transmit, as the control command, an individual control command that is transmitted individually to a specific control device of the plurality of control devices, or a collective control command that is broadcasted collectively to two or more control devices of the plurality of control devices, and wherein each control device comprise: a command determination unit for determining whether the received control command is the individual control command or the collective control command; and an information processing unit which, if the received control command is the individual control command, responds by collectively broadcasting to the plurality of operation terminals a state change notification corresponding to the execution of the individual control command, and, if the received control command is the collective control command, responds by collectively broadcasting to the plurality of operation terminals, with a timing different from the other control devices, a state change notification corresponding to the execution of the collective control command. In this device control system, all operation terminals can get the state changes of the plurality of control devices in the system, and furthermore can receive the state change notifications more certainly when obtaining the state change notifications from the plurality of control devices, and furthermore a decrease in the communication efficiency can be prevented.

In this invention, preferably, the information processing unit of each control device determines the timing for transmitting the state change notification corresponding to the execution of the collective control command, based on a value that is equal to or more the number of the plurality of control devices that are being connected to the network, when receiving the collective control command.

In this invention, preferably, the information processing unit of each control device determines the timing for transmitting the state change notification corresponding to the execution of the collective control command, based on a value of the maximum number of control devices that are connectable to the network, when receiving the collective control command.

In this invention, preferably, the device control system further comprises a static time limit setting part and a random number generator, and wherein in the case where control devices, being equal to or more the number of the plurality of control devices that are being connected to the network, transmit, with timings that are different from each other, state change notifications corresponding to the execution of the collective control command, the static time limit setting part is configured to set, to a static time limit, a time or more required for the plurality of operation terminals to receive all state change notifications transmitted by the control devices, and wherein the random number generator generates a random number for each control device, and wherein the information processing unit of each control device transmits, the state change notification, with the timing within the static time limit based on the random number generated by the random number generator, when receiving the collective control command.

In this invention, preferably, the static time limit is a permissible maximum time from when each control device receives the collective control command till when responding by transmitting the state change notification.

In this invention, preferably, the device control system further comprises a prohibition period setting part which is configured to set a notification prohibition period that is a period from when each control device transmits the state change notification till when the transmission of next state change notification is allowed, based on the number of the plurality of control devices that are being connected to the network, and wherein the information processing unit of each control device is configured so as not to transmit the next state change notification before the notification prohibition period passes from the time when transmitting the state change notification.

In this invention, preferably, the information processing unit of each control device determines the timing for transmitting the state change notification corresponding to the execution of the collective control command, based on the number of the two or more control devices, being objects to be controlled, to which each operation terminal transmits the collective control command, when receiving the collective control command.

In this invention, preferably, the device control system further comprise a dynamic time limit setting part and a random number generator, and wherein the dynamic time limit setting part is configured to set a dynamic time limit, based on the number of the two or more control devices, being objects to be controlled, to which each operation terminal transmits the collective control command, and wherein the random number generator generates a random number for each control device, and wherein the information processing unit of each control device transmits, the state change notification, with the timing within the dynamic time limit based on the random number generated by the random number generator, when receiving the collective control command.

In this invention, preferably, the device control system further comprises a prohibition period setting part which is configured to set a notification prohibition period that is a period from when each control device transmits the state change notification till when the transmission of next state change notification is allowed, based on the number of the two or more control devices, being objects to be controlled, to which each operation terminal transmits the collective control command, and wherein the information processing unit of each control device is configured so as not to transmit the next state change notification before the notification prohibition period passes from the time when transmitting the state change notification.

In this invention, preferably, the device control system further comprises a dynamic time limit setting part, which is configured to set a dynamic time limit, based on the number of the two or more control devices, being objects to be controlled, to which each operation terminal transmits the collective control command, and wherein the collective control command includes a first collective control command or a second collective control command, and wherein the information processing unit of each control device is configured: to transmit a state change notification corresponding to the execution of the first collective control command, with the timing within the dynamic time limit based on the random number generated by the random number generator, when receiving the first collective control command; and to transmit a state change notification corresponding to the execution of the second collective control command, with the timing within the static time limit based on the random number generated by the random number generator, when receiving the second collective control command before the dynamic time limit passes from the time when receiving the first collective control command.

In this invention, preferably, the collective control command includes a first collective control command or a second collective control command, and wherein the information processing unit of each control device is configured: to transmit a state change notification corresponding to the execution of the first collective control command, with the timing within a first dynamic time limit based on the random number generated by the random number generator, when receiving the first collective control command; and to transmit a state change notification corresponding to the execution of the second collective control command, with the timing within a second dynamic time limit based on the random number generated by the random number generator after the first dynamic time limit passes, when receiving the second collective control command before the first dynamic time limit passes from the time when receiving the first collective control command.

In this invention, preferably, the device control system, further comprises a dynamic time limit setting part, which is configured to set a dynamic time limit, based on the number of the two or more control devices, being objects to be controlled, to which each operation terminal transmits the collective control command, and wherein the collective control command includes a first collective control command or a second collective control command, and wherein the information processing unit of each control device is configured: to transmit a state change notification corresponding to the execution of the first collective control command, with the timing within a first dynamic time limit based on the random number generated by the random number generator, when receiving the first collective control command; and to transmit a state change notification corresponding to the execution of the second collective control command, with the earlier of the timing within the static time limit based on the random number generated by the random number generator or the timing within a second dynamic time limit based on the random number generated by the random number generator, when receiving the second collective control command before the first dynamic time limit passes from the time when receiving the first collective control command.

In this invention, preferably, the collective control command includes a first collective control command which has information of the number of the two or more control devices being objects to be controlled, or a second collective control command which does not have information of the number of the two or more control devices being objects to be controlled, and wherein the device control system further comprises a dynamic time limit setting part, which is configured to set a dynamic time limit, based on the number of the two or more control devices, being objects to be controlled, to which each operation terminal transmits the collective control command, and wherein the information processing unit of each control device is configured: to transmit a state change notification corresponding to the execution of the first collective control command, with the timing within the dynamic time limit based on the random number generated by the random number generator, when receiving the first collective control command; to transmit a state change notification corresponding to the execution of the second collective control command, with the timing within the static time limit based on the random number generated by the random number generator, when receiving the second collective control command; and to transmit a state change notification corresponding to the execution of the first collective control command, with the timing within the static time limit based on the random number generated by the random number generator, when receiving the first collective control command before the static time limit passes from the time when receiving the second collective control command.

BRIEF DESCRIPTION OF THE DRAWINGS

Preferred embodiments of the invention will now be described in further details. Other features and advantages of the present invention will become better understood with regard to the following detailed description and accompanying drawings where:

FIG. 2A is a diagram showing the configuration of a control command in the device control system according to the Embodiment 1 of the present invention;

FIG. 2B is a diagram showing the configuration of a pattern control command in the device control system according to the Embodiment 1 of the present invention;

FIG. 2C is a diagram showing the configuration of a group control command in the device control system according to the Embodiment 1 of the present invention;

FIG. 2D is a diagram showing the configuration of a single control command in the device control system according to the Embodiment 1 of the present invention;

FIG. 3 is a diagram showing the configuration of a state change notification in the device control system according to the Embodiment 1 of the present invention;

FIG. 9A is a diagram showing the configuration of a pattern control command in the device control system according to the Embodiment 4 of the present invention;

FIG. 9B is a diagram showing the configuration of a group control command in the device control system according to the Embodiment 4 of the present invention;

FIG. 10 is a diagram showing the configuration of a control terminal in a device control system according to Embodiment 5 of the present invention;

BEST MODE FOR CARRYING OUT THE INVENTION

Embodiments of the present invention will be explained below based on Figures.

Embodiment 1

Figure 1:
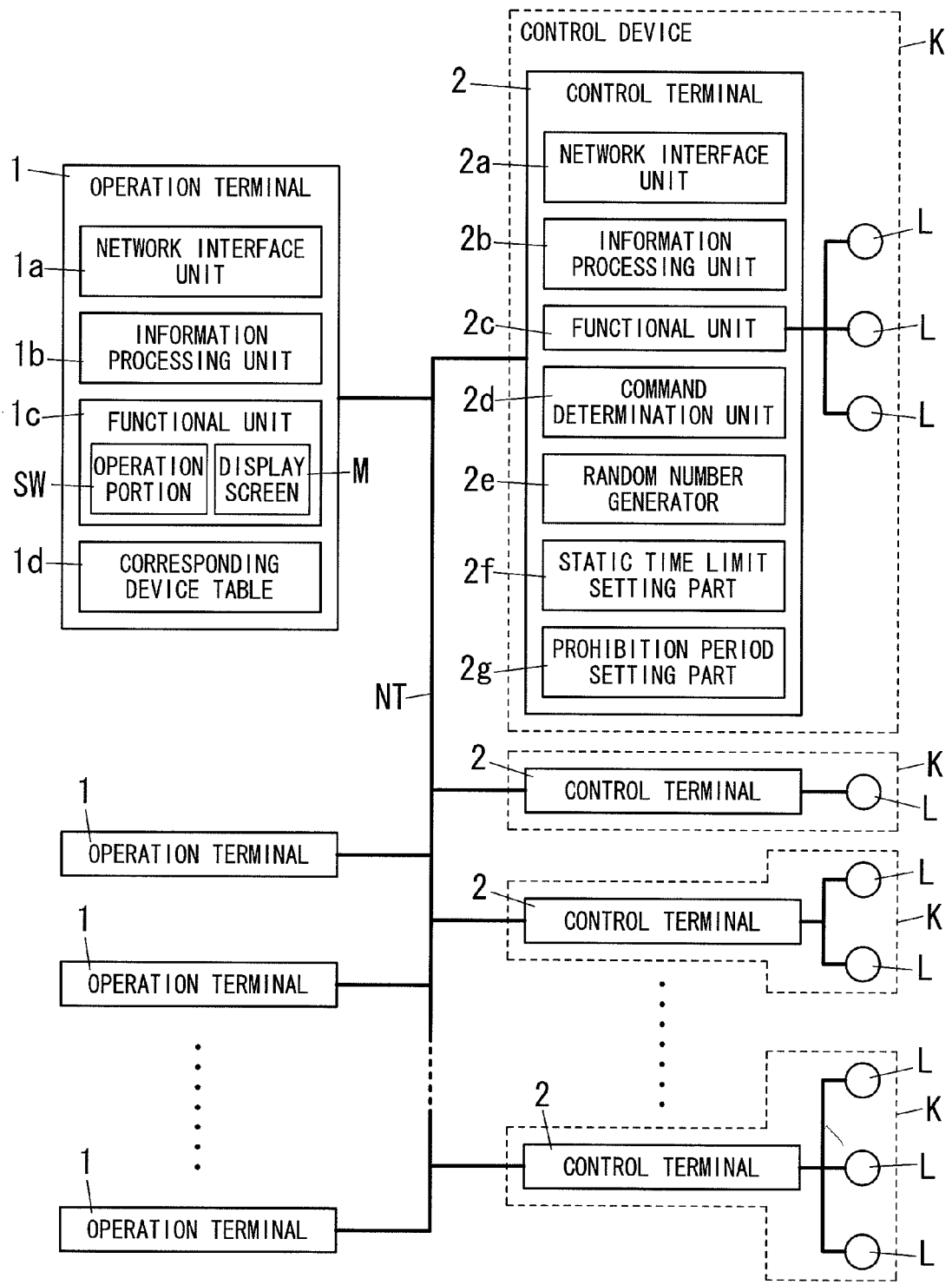
FIG. 1 is a diagram showing the configuration of a device control system according to Embodiment 1 of the present invention.

FIG. 1 shows the configuration of a device control system according to the present embodiment. The device control system includes a plurality of operation terminals 1 connected to a network NT and a plurality of control devices K connected to the network NT, and these operation terminals 1 and control devices K are configured to be capable of communicating with each other. Each control device K includes a control terminal 2 and one or more device L under the control of the control terminal 2. The control terminal 2 controls motion of its own device(s) L. Then, each operation terminal 1 monitors and controls control states of devices L through control terminals 2. For example, when one operation terminal 1 transmits a control command to one or more control terminals 2, each control terminal 2 executes the received control command to control its own device(s) L. Then, each control terminal 2 responds by transmitting, to all operation terminals 1, a state change notification that represents a control state of a device(s) L changed by the execution of the control command.

That is, in each control device K, the control terminal 2 executes the control command to control its own device(s) L, and responds by transmitting the state change notification to all operation terminals 1 when a control state of a device(s) L is changed by the execution of the control command.

First, each control terminal 2 is configured to control the motion of its own device(s) L, such as lighting equipment or air-conditioning equipment, and is provided with a lighting control device that turns the lighting equipment on and off and controls the dimming level of the lighting equipment, or an air-conditioning control device that operates the air-conditioning equipment. Then, each control terminal 2 includes a network interface unit 2a, an information processing unit 2b, a functional unit 2c, a command determination unit 2d, a random number generator 2e, a static time limit setting part 2f, and a prohibition period setting part 2g. The network interface unit 2a stores information of a unique address (IP address and MAC address) for each control terminal 2, and performs the network communication based on the information of the unique address.

In each control terminal 2, the functional unit 2c is configured based on services (the function of each control terminal 2) provided by each control terminal 2. When a control terminal 2 is a lighting control device, the functional unit 2c comprises a lighting control means having a function to turn a lighting device L on and off and to control the brightness. When a control terminal 2 is an air-conditioning control device, the functional unit 2c comprises an air-conditioning control means having a function to control the temperature of an air-conditioning device L. Further, the functional unit 2c can be configured to control not only one device L but also a plurality of devices L individually. Then, a circuit identifier is provided to each device L, as a unique identifier on the network NT. That is, one control terminal 2 has one or more circuit identifiers.

Each operation terminal 1 includes a network interface unit 1a, an information processing unit 1b, a functional unit 1c, and a corresponding device table 1d. The network interface unit 1a stores information of a unique address (IP address and MAC address) for each operation terminal 1, and performs the network communication based on the information of the unique address.

In each operation terminal 1, the functional unit 1c is configured based on services (the function of each operation terminal 1) provided by each operation terminal 1. Each operation terminal 1 comprises a means that transmits and receives information through the network NT to control the control terminals 2, and that monitors and controls the control states of the devices L through the control terminals 2. Specifically, the functional unit 2c is provided with an operation portion SW that controls the control terminals 2 through user operation, and a display screen M, such as a LCD, that displays the control states of the devices L controlled by the control terminals 2.

The corresponding device table 1d stores (a terminal identifier of) a control terminal 2 or (a circuit identifier(s) of) a device(s) L under the control of the control terminal 2, corresponding to each operation inputted through the operation portion SW. In the individual control, one control terminal 2 or one device L is set so as to correspond to one operation. In the collective control, a plurality of control terminals 2, or a plurality of devices L in the plurality of control terminals 2 are set so as to correspond to one operation. Further, when only control terminals 2 are set so as to correspond to each operation (that is, when devices L are not set so as to directly correspond to each operation), it means that all devices L under the control of the control terminal 2 are set so as to correspond to each operation.

Then, the display screen M of each operation terminal 1 displays a control state of each device L of control terminals 2 that have been associated in its own corresponding device table 1d. For example, when a control terminal 2 is a lighting control device, "Lighting-up", "Light down" or "Dimming level" is displayed as a control state of a lighting device L. When a control terminal 2 is an air-conditioning control device, "In operation", "Stop" or "Control temperature" is displayed as a control state of an air-conditioning device L.

Then, in order to achieve an object server function in the device control system, a software module including objects is incorporated in each of the information processing units 1b, 2b. The software module performs a processing that gives a function for providing a movement directive to the functional units 1c, 2c, a processing that obtains a variable expressing the control state of the functional units 1c, 2c, a processing that obtains event information expressing the state change generated in the functional units 1c, 2c, and the like.

As described above, in operation terminals 1 and control terminals 2 of the present embodiment, each of the software modules incorporated in the information processing units 1b, 2b is provided with objects used upon performing a processing for providing services. Each object is provided with one or more input-output definition (hereinafter, called interface) that define the control information or the monitoring information (a variable, a function, event information or combinations) corresponding to services provided by the functional units 1c, 2c. Then, an interface identifier (hereinafter, called IID) is provided to each interface. Further, an object unique identifier (hereinafter, called OID) is provided to each object. That is, each object has a provided identifier (OID+IID) that is constituted by OID and IID.

In the present embodiment, each object corresponds one-on-one to one terminal of operation terminals 1 and control terminals 2. The OID also functions as a terminal identifier for identifying each terminal of operation terminals 1 and control terminals 2.

When operation portion SW is operated, the information processing unit 1b refers to the corresponding device table 1d and transmits a control command using a provided identifier corresponding to the operation.

On the other hand, the information processing unit 2b analyzes the control command, operates an object in response to the control command, and executes a processing that provides control information to the functional unit 2c, when receiving the control command using the provided identifier. The functional unit 2c controls a device(s) L, when receiving the control information. When a control state of a device L is changed by the execution of the control command, the information processing unit 2b broadcasts a state change notification about the device L collectively to all operation terminals 1 that are being connected to the network NT.

Each operation terminal 1 updates the operating state display of the device L in the display screen M based on the state change notification if the device L in which the control state has been changed is associated in its own corresponding device table 1d, when receiving the state change notification.

As shown in FIG. 2A, the control command includes at least an operation code that expresses the type of the command, the above-mentioned IID that expresses the provided services (the function), the above-mentioned OID that expresses a destination, and a parameter that expresses an object to be controlled or a control content.

In the control command, "INVOKE" is set in the operation code. The "INVOKE" is used as a control request for operating a function of an object which is given OID and IID designated in the command and for providing the control information to the functional unit 2c. As other operation codes in the control command, for example, there are "WATCH", "GET" and "SET". The "WATCH" is used as a search request for searching, on the network, an object given OID and IID designated in the command. The "GET" is used as an acquisition request for acquiring a value of an object given OID and IID designated in the command. The "SET" is used as a setting request for setting a value to an object given OID and IID designated in the command.

A pattern control command shown in FIG. 2B is basically a command for collectively controlling, with different control contents, devices L in two or more control terminals 2 at the same time. In the pattern control command a pattern control method is set in the IID, and a broadcast identifier is set in the OID. Further, a circuit identifier of each controlled device L, a terminal identifier of a control terminal 2 (a control terminal 2 being an object to be controlled) to which each controlled device L is connected, and a control content for each device L are set in the parameter.

A group control command shown in FIG. 2C is basically a command for collectively controlling, with the same control contents, devices L in two or more control terminals 2 at the same time. Then, a group control method is set in the IID, and a broadcast identifier is set in the OID. Further, a control content common to all controlled devices L, a circuit identifier of each controlled device L, and a terminal identifier of a control terminal 2 (a control terminal 2 being an object to be controlled) to which each controlled device L is connected are set in the parameter.

As described above, when the broadcast identifier is set in the OID of the pattern control command or the group control command, the control command is broadcasted collectively to a plurality of control terminals 2, and then devices L under the control of the plurality of control terminals 2 can be controlled collectively. That is, the pattern control command and the group control command function as a collective control command, by means of having the broadcast identifier in its own OID.

However, one terminal identifier of one control terminal 2 (OID of an object that is provided in a control terminal 2 being an object to be controlled) can be also set in the OID of the pattern control command or the group control command. In this case, the control command is transmitted to one control terminal 2 only, and thereby only a device(s) L under the control of the one control terminal 2 can be controlled. That is, the pattern control command and the group control command function as an individual control command, by means of having a terminal identifier of any one control terminal 2 in its own OID.

A single control command shown in FIG. 2D is basically a command for controlling one control terminal 2. Then, an individual control method is set in the IID, and a terminal identifier of one control terminal 2 being an object to be controlled (OID of an object that is provided in a control terminal 2 being an object to be controlled) is set in the OID. Further, a control content of one control terminal 2 being an object to be controlled is set in the parameter.

In this way, when a terminal identifier of one control terminal 2 is set in the OID of the single control command, the control command is transmitted to the one control terminal 2 only and then only a device(s) L under the control of the one control terminal 2 can be controlled. That is, the single control command functions as an individual control command, by means of having a terminal identifier of one control terminal 2 in its own OID.

However, the broadcast identifier can be also set in the OID of the single control command. In this case, the single control command is broadcasted collectively to a plurality of control terminals 2, and devices L under the control of the plurality of control terminals 2 can be controlled collectively. That is, the single control command functions as a collective control command, by means of having the broadcast identifier in its own OID.

As described above, the pattern control command, the group control command and the single control command function as a collective control command that can control collectively devices L under the control of a plurality of control terminals 2, when the broadcast identifier is set in its own OID.

Then, the pattern control command, the group control command and the single control command function as an individual control command that can control only a device(s) L under the control of one control terminal 2, when a terminal identifier of the one control terminal 2 is set in its own OID.

When a control terminal 2 receives one of the abovementioned control commands, the command determination unit 2d determines whether the received control command is the individual control command or the collective control command. This command determination processing determines the type of the command based on a content that is set in the OID of the control command.

When a terminal identifier of one control terminal 2 is set in the OID of the control command, the command determination unit 2d determines that the received control command is the individual control command. Then, when each control terminal 2 receives the individual control command, only a control terminal 2 corresponding to the terminal identifier set in the individual control command executes the individual control command, and then the functional unit 2c receives control information and controls its own device(s) L. That is, only the information processing unit 2b in the one control terminal 2 executes a control content designated in the individual control command. Then, soon after the execution of the individual control command, the one control terminal 2 responds by collectively broadcasting to all operation terminals 1 on the network NT a state change notification expressing a control state of a device(s) L that has been changed by the execution of the individual control command. Therefore, the device control system can reflect effectively the change of the control state on display contents of all operation terminals 1 existing on the network NT.

Then, each operation terminal 1 on the network NT determines whether or not a device(s) L in which the control state has been changed is associated in its own corresponding device table 1d, when receiving the state change notification that has been broadcasted collectively. If determining that the device(s) L is associated in its own corresponding device table 1d, an operation terminal 1 updates the operating state display of the device(s) L in the display screen M based on the state change notification.

When a broadcast identifier is set in the OID of the control command, the command determination unit 2d determines that the received control command is the collective control command. When the command determination unit 2d determines that the control command which has been transmitted from the operation terminal 1 is the collective control command, a control terminal 2 having a device L corresponding to a circuit identifier set in the collective control command executes the collective control command. That is, the information processing unit 2b in each of the control terminals 2 being objects to be controlled through the collective control command executes a control content designated in the collective control command. Then, each of the control terminals 2 responds by collectively broadcasting to all operation terminals 1 on the network NT a state change notification expressing a control state of a device(s) L that has been changed by the execution of the collective control command.

As shown in FIG. 3, a state change notification includes at least an operation code in which "INVOKE" is set, IID in which a state notification method is set, OID in which a broadcast identifier is set, a circuit identifier of a device L in which a control state has been changed, and a parameter in which the changed control state is set.

However, a collective control command is broadcasted collectively by an operation terminal 1. That is, when a plurality of control terminals 2, being objects to be controlled by the collective control command, respond by transmitting state change notifications at the same time, the packets of the state change notifications may collide with each other in the case where the communication transport in the network NT is performed at low speed. Therefore, there is a possibility that packet loss is generated and operation terminals 1 can not receive the state change notifications.

Figure 4:
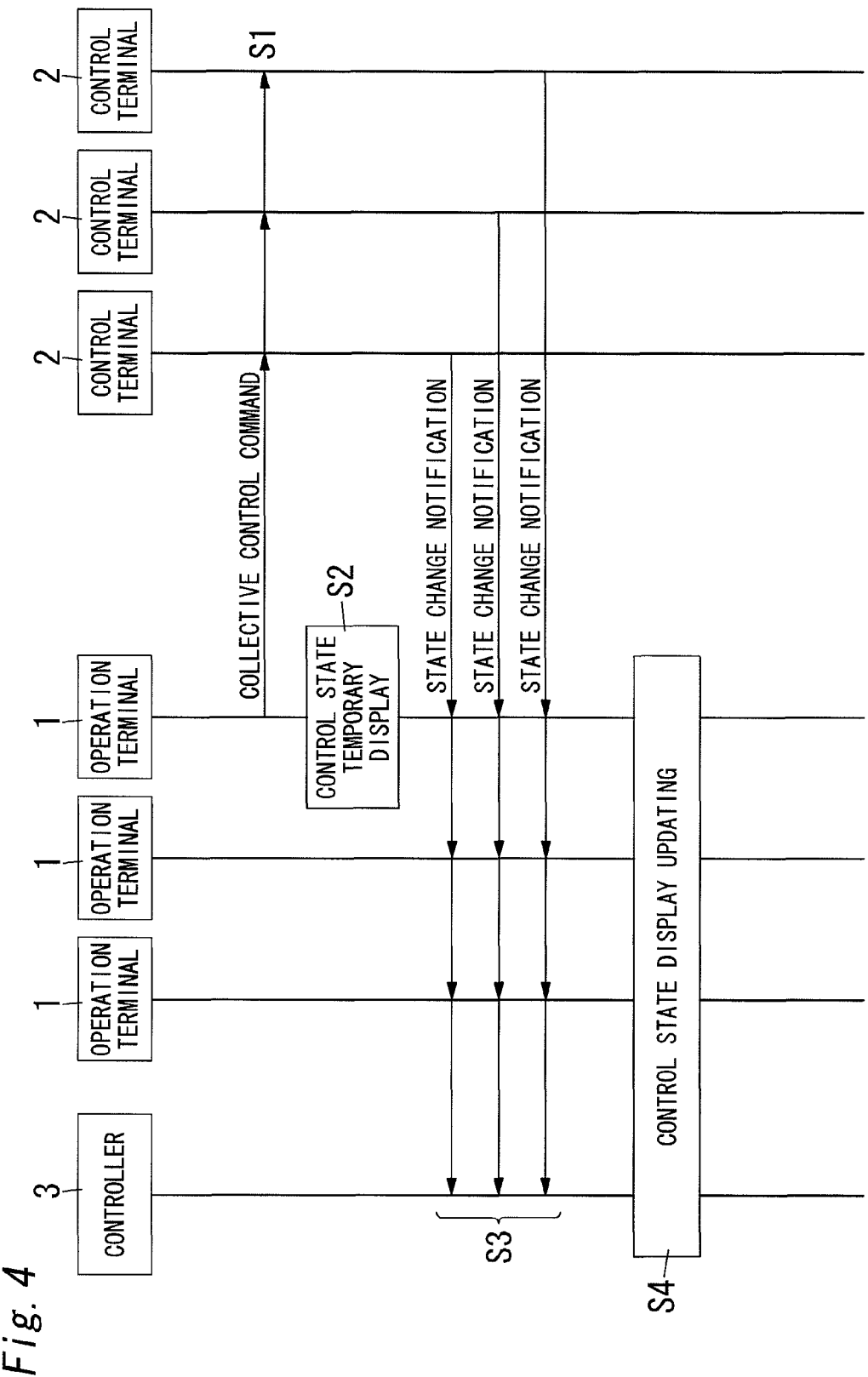
FIG. 4 is a diagram showing a communication sequence of collectively broadcasting in the device control system according to the Embodiment 1 of the present invention.

So in the present embodiment, the communication processing, using collectively broadcasting, is performed between operation terminals 1 and control terminals 2, as a sequence shown in FIG. 4, to reduce the packet loss caused by the collision of the state change notifications transmitted in response to the broadcast of the collective control command.

First, the static time limit setting part 2f of each control terminal 2 is configured to set a static time limit previously [sec]. The static time limit is a permissible maximum time from when each control terminal 2 receives the collective control command till when responding by transmitting the state change notification. Specifically, when control terminal 2, which are actually being connected to the network NT, respond by collectively broad-casting, with timings that are different from each other, state change notifications corresponding to the execution of the collective control command, a time (or more) required for all operation terminals 1 to receive all state change notifications which have been transmitted is set to the static time limit. The setting processing of the static time limit in the static time limit setting part 2f is performed by user manual operation, or by the network communication through a terminal which gets the number of all control terminals 2 connected to the network NT.

Figure 5:
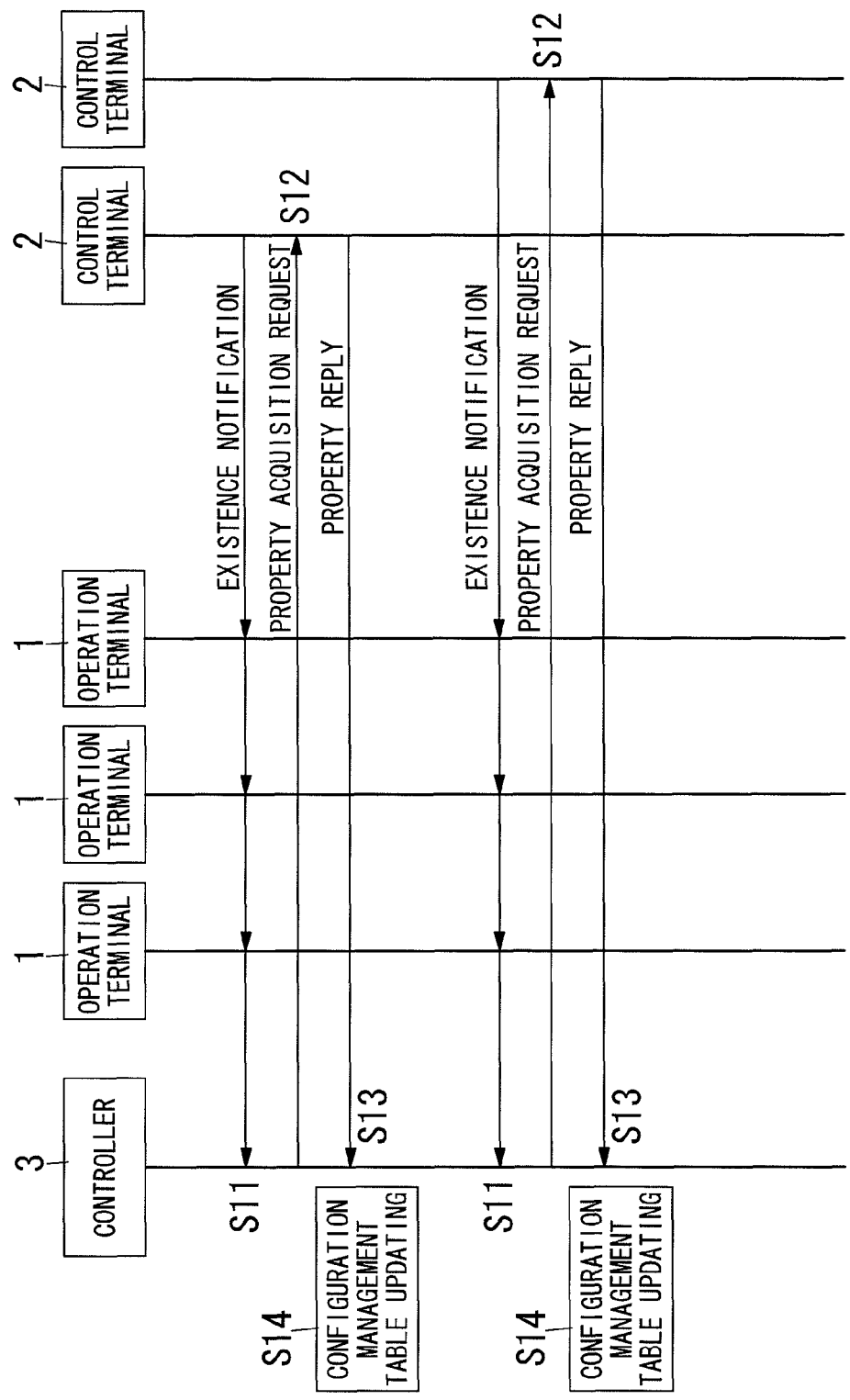
FIG. 5 is a diagram showing a communication sequence of configuration management in the device control system according to the Embodiment 1 of the present invention.

For example, a controller 3 for integrating and managing the present system is provided on the network NT (see FIG. 5). The controller 3 gets the number of all control terminals 2 on the network NT. Specifically, as shown in a sequence of FIG. 5, each of control terminals 2 broadcasts collectively to the network NT an existence notification that includes OID and IID of its own object (S11), when joining the network. When receiving the existence notification from a control terminal 2, the controller 3 performs the unicast transmission of a property acquisition request to the control terminal 2, using data of the OID and IID included in the existence notification (S12). When receiving the property acquisition request, the control terminal 2 performs, to the controller 3, the unicast transmission of a property reply that includes its own type information (the lighting control, air-conditioning control, or the like) (S13).

The controller 3 previously has a configuration management table that stores the information regarding each control terminal 2 on the network NT. Then, the controller 3 adds, to the configuration management table, the information (OID, IID, type information) regarding the control terminal 2 that newly has joined the network NT, thereby updating the table, when acquiring the type information from the control terminal 2 (S14).

In this way, the controller 3 collects information regarding all control terminals 2 on the network NT to reflect on the configuration management table, thereby getting the number of all control terminals 2 on the network NT. Then, the controller 3 broadcasts collectively to the network NT the information expressing the number of all control terminals 2 on the network. The static time limit setting part 2f of each control terminal 2 is configured to perform the processing for setting the static time limit based on the information expressing the number of all control terminals 2. The timing on when the controller 3 broadcasts collectively to the network NT the information expressing the number of all control terminals 2 is set for each updating of the configuration management table or for each constant time.

The configuration management table, on which the information regarding all control terminals 2 on the network NT is reflected, may be provided in each of control terminals 2. Further, the configuration management table may be provided in each of operation terminals 1, and then an operation terminal 1 may transmit, to each control terminal 2 via the network NT, the information expressing the number of all control terminals 2.

Further, the static time limit may be set based on the maximum number of control terminals 2 that are connectable to the network NT. When the control terminals 2 that are connectable to the network NT respond by transmitting, with timings that are different from each other, the state change notifications corresponding to the execution of the collective control command, a time required for all operation terminals 1 to receive all state change notifications which have been transmitted is set to the static time limit.

When a collective control operation is performed in the operation portion SW of an operation terminal 1, the information processing unit 1b broadcasts collectively to all control terminals 2 existing on the network NT a collective control command (S1). The operation terminal 1, in which the collective control operation has been performed, temporarily shows on the display screen M that the collective control is in process until the collective control processing is completed (S2).

The information processing unit 2b of each control terminal 2 executes a control content designated in the collective control command, if its own device(s) L corresponds to a circuit identifier included in the collective control command which has been received from the operation terminal 1. Then, the functional unit 2c controls its own device(s) L, when receiving the control information.

Furthermore, in each of control terminals 2, when the collective control command is executed, the random number generator 2e generates a random number at a range of 0.0 to 1.0. The information processing unit 2b sets, to a response time, a value obtained by multiplying the random number by the static time limit that has been set by the static time limit setting part 2f. That is, the static time limit is set based on the number of control terminals 2 which are being connected to the network NT, and the response time is set randomly at a range of 0 to the static time limit [sec].

Next, the information processing unit 2b starts checking time, and responds by broadcasting collectively to all operation terminals 1 on the network NT, with a timing of when the time corresponds to the response time, the state change notification. That is, timings of when the state change notifications are broadcasted collectively by a plurality of control terminals 2 that have executed the collective control command are set randomly for each control terminal 2, and preferably are distributed uniformly in a range of 0 to the static time limit [sec] (S3).

Accordingly, even when the communication transport in the network NT is performed at low speed, the packet loss caused by the collision of the state change notifications transmitted in response to the broadcast of the control command is reduced. When obtaining the state change notification of a device(s) L from each of the control terminals 2 by broadcasting, each operation terminal 1 can receive the state change notification more certainly, and moreover a decrease in the communication efficiency can be prevented.

Further, the control command and the state change notification can be transmitted and received, by broadcasting collectively, between a plurality of operation terminals 1 and a plurality of control terminals 2, without performing polling. Therefore, the device control system can prevent the communication traffic and can achieve reliable receiving of the state change notification.

In addition, the static time limit is set and used based on the number of control terminals 2 that are being connected to the network NT, and thereby the range of variation of the static time limit is small, and the processing for setting the response time can be simplified.

The abovementioned processing for checking time in the information processing unit 2b may be configured to start at a time of when the control command is received, at a time of when the determination processing is completed in the command determination unit 2d, or at a time of when the random number generator 2e generates the random number.

Then, each of operation terminals 1 on the network NT determines whether or not a device(s) L in which the control state has been changed is associated in its own corresponding device table 1d, when receiving the state change notification that has been broadcasted collectively. If determining that the device(s) L is associated in its own corresponding device table 1d, an operation terminal 1 updates the operating state display of the device(s) L in the display screen M based on the state change notification (S4).

Also, the controller 3 provided on the network NT may be configured to obtain the state change notification that has been broadcasted collectively from each control terminal 2, and to get control states of all devices L under the control of all control terminals 2 on the network NT.

The information processing unit 2b performs the following processing, when receiving a second round of a collective control command (a second collective control command) during a period from when receiving a first round of a collective control command (a first collective control command) till when transmitting a state change notification corresponding to the execution of the first round of the collective control command. With respect to the execution of the two collective control commands, the information processing unit 2b does not transmit two state change notifications separately, but transmits one state change notification including control states of devices L that have been changed by the two collective control commands after the execution of the second round of the collective control command.

Further, the prohibition period setting part 2g sets a notification prohibition period to prohibit the transmission of next state change notification, after transmitting a state change notification corresponding to the execution of the first round of the collective control command (the first collective command). Then, the information processing unit 2b does not perform the transmission of the next state change notification before the notification prohibition period passes, even when receiving the second round of the collective control command (the second collective command) after transmitting the state change notification corresponding to the execution of the first round of the collective control command (the first collective command). The prohibition period setting part 2g is configured to lengthen the notification prohibition period with an increase in the number of control terminals 2 that are being connected to the network NT, considering the communication transport in the network NT.

Then, after the notification prohibition period passes, the random number generator 2e generates the random number and then the next state change notification corresponding to the execution of the second round of the collective control command is transmitted at the response time that is set as explained above. Therefore, the device control system can maintain almost a constant level of the communication load on the network NT caused by transmission of the state change notifications, and can further prevent the packet loss. The state change notification corresponding to the execution of the second round of the collective control command may be transmitted without performing the processing for generating the random number again, when the notification prohibition period passes.

Further, an operation switch (not shown) may be provided in each control terminal 2, and then each control terminal 2 may be configured to execute the control command to control its own device(s) L, when its own operation switch is operated. In this case, like the processing upon the abovementioned individual control, soon after the execution of the command, the control terminal 2 transmits to all operation terminals 1a state change notification corresponding to the execution of the control command.

In addition, a static time limit setting part may be provided in each operation terminal 1 or the controller 3, and then each operation terminal 1 or the controller 3 may transmit to each control terminal 2 the information of the static time limit via the network NT.

Embodiment 2

Figure 6:
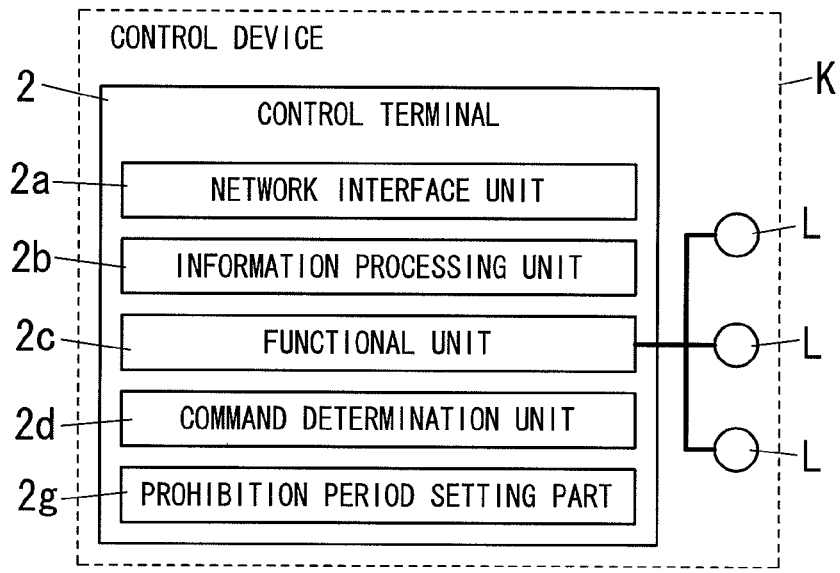
FIG. 6 is a diagram showing the configuration of a control terminal in a device control system according to Embodiment 2 of the present invention.

As shown in FIG. 6, in a device control system of the present embodiment, each control terminal 2 is not provided with the random number generator 2e and the static time limit setting part 2f of the Embodiment 1. Further, a method for setting a response time in the present embodiment is different from that in the Embodiment 1. The constituent elements same as those of the Embodiment 1 are assigned with same reference numerals and the explanation thereof is omitted.

The information processing unit 2b of each control terminal 2 is configured to set a response time based on a rank of its own terminal identifier that has been set in a parameter of the received collective control command. Specifically, the information processing unit 2b determines where its own terminal identifier has been ranked (a set rank), in a parameter of a pattern control command that performs a collective control (see FIG. 2B), or in a parameter of a group control command that performs a collective control (see FIG. 2C). Then, the information processing unit 2b memorizes a time (that is, a time required to respond) from when one control terminal 2 receives a collective control command till when the one control terminal 2 transmits a state change notification. Then, the information processing unit 2b sets, to a response time, a time obtained by multiplying the set rank of its own terminal identifier by the time required to respond. That is, the response time of the present embodiment is determined based on the number of control terminals 2 being objects to be controlled through the collective control command. Further, when its own terminal identifier is set several times in the parameter of the received collective control command, the set rank of the last terminal identifier (or the first terminal identifier) is adopted.

Next, the information processing unit 2b starts checking time, and broadcasts collectively to all operation terminals 1 on the network NT, with a timing of when the time corresponds to the response time, the state change notification. That is, timings of when the state change notifications are broadcasted collectively by a plurality of control terminals 2 that have executed the collective control command are set randomly for each control terminal 2.

Accordingly, even in the case where the communication transport in the network NT is performed at low speed, the packet loss caused by the collision of the state change notifications transmitted in response to the broadcast of the control command is reduced. When obtaining the state change notification of a device(s) L from each of the control terminals 2 by broadcasting collectively, each operation terminal 1 can receive the state change notification more certainly, and moreover a decrease in the communication efficiency can be prevented.

Then, each of operation terminals 1 on the network NT determines whether or not a device(s) L in which the control state has been changed is associated in its own corresponding device table 1d, when receiving the state change notification that has been broadcasted collectively. If determining that the device(s) L is associated in its own corresponding device table 1d, an operation terminal 1 updates the operating state display of the device(s) L in the display screen M based on the state change notification.

Embodiment 3

Figure 7:
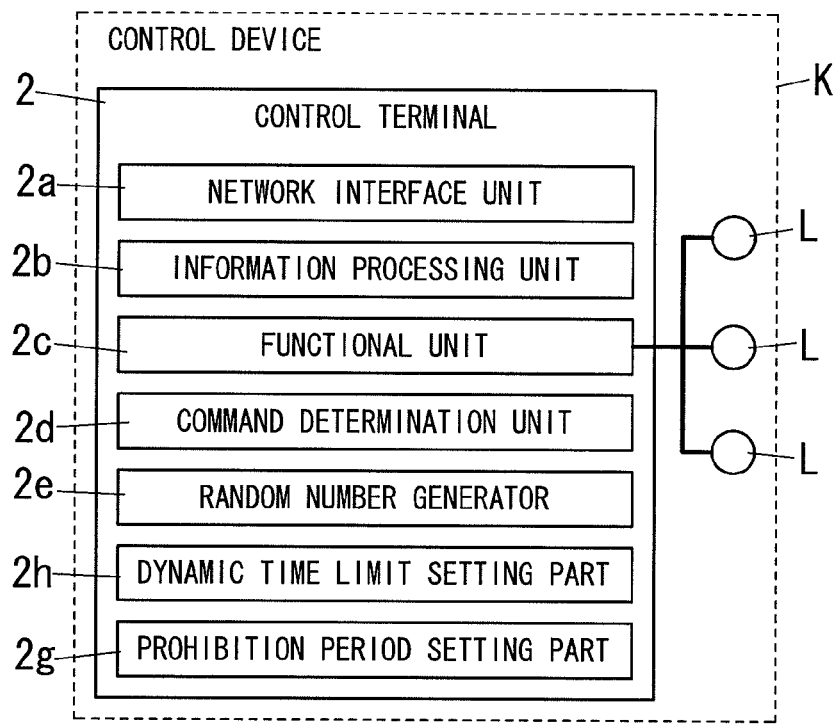
FIG. 7 is a diagram showing the configuration of a control terminal in a device control system according to Embodiment 3 of the present invention.

As shown in FIG. 7, a device control system of the present embodiment is provided with a dynamic time limit setting part 2h instead of the static time limit setting part 2f of the Embodiment 1. Further, a method for setting a time limit in the present embodiment is different from that in the Embodiment 1. The constituent elements same as those of the Embodiment 1 are assigned with same reference numerals and the explanation thereof is omitted.

The dynamic time limit setting part 2h of each control terminal 2 sets a dynamic time limit based on the number of control terminals 2 that has been set in a parameter of the received collective control command. The dynamic time limit is a permissible maximum time from when each control terminal 2 receives the collective control command till when responding by transmitting a state change notification, and is set based on the number of control terminals 2 being actual objects to be controlled.

Specifically, the dynamic time limit setting part 2h calculates the number of control terminals 2 being objects of the collective control, referring to terminal identifiers of control terminals 2 included in a parameter of a received pattern control command (see FIG. 2B), or in a parameter of a received group control command (see FIG. 2C). In this case, when the control terminals 2 respond by collectively broadcasting state change notifications corresponding to the execution of the collective control command, with timings that are different from each other, the dynamic time limit setting part 2h sets, to the dynamic time limit, a time (or more) required for operation terminals 1 to receive all state change notifications transmitted by the control terminals 2. The dynamic time limit setting part 2h has previously a corresponding table that makes the connection between the dynamic time limit and the number of control terminals 2 being objects of the collective control. The dynamic time limit setting part 2h sets the dynamic time limit, referring to the corresponding table.

Then, when each of a plurality of control terminals 2 executes the collective control command, the random number generator 2e generates a random number at a range of 0.0 to 1.0. The information processing unit 2b sets, to a response time, a value obtained by multiplying the random number by the dynamic time limit that has been set by the dynamic time limit setting part 2h. That is, the dynamic time limit is set based on the number of control terminals 2 being objects of the collective control, and the response time is set randomly in a range of 0 to the dynamic time limit [sec].

Next, the information processing unit 2b starts checking time, and broadcasts collectively to operation terminals 1 on the network NT, with a timing of when the time corresponds to the response time, the state change notification. That is, timings of when the state change notifications are broadcasted collectively by a plurality of control terminals 2 that have executed the collective control command are set randomly for each control terminal 2, and preferably are distributed uniformly in a range of 0 to the dynamic time limit [sec].

Therefore, even when the communication transport in the network NT is performed at low speed, the packet loss caused by the collision of the state change notifications transmitted in response to the broadcast of the control command is reduced. When obtaining the state change notification of a device(s) L from each of the control terminals 2 by broadcasting, each operation terminal 1 can receive the state change notification more certainly, and moreover a decrease in the communication efficiency can be prevented.

Further, the dynamic time limit is set and used based on the number of control terminals 2 being objects to be controlled through the collective control command, and therefore an optimum time limit is set for each collective control command, and the device control system can satisfy both of reliable receiving of the state change notification and securing of the communication efficiency optimally for each collective control command.

Then, each of operation terminals 1 on the network NT determines whether or not a device(s) L in which the control state has been changed is associated in its own corresponding device table 1d, when receiving the state change notification that has been broadcasted collectively. If determining that the device(s) L is associated in its own corresponding device table 1d, an operation terminal 1 updates the operating state display of the device(s) L in the display screen M based on the state change notification.

Further, the prohibition period setting part 2g sets a notification prohibition period to prohibit the transmission of next state change notification, after transmitting a state change notification corresponding to the execution of a first round of a collective control command (a first collective command). Then, the information processing unit 2b does not perform the transmission of the next state change notification before the notification prohibition period passes, even when receiving a second round of a collective control command (a second collective command) after transmitting the state change notification corresponding to the execution of the first round of the collective control command (the first collective command). The prohibition period setting part 2g is configured to lengthen the notification prohibition period with an increase in the number of control terminals 2 being objects to be controlled through the first round of the collective control command, considering the communication transport in the network NT.

Then, after the notification prohibition period passes, the random number generator 2e generates the random number and then the next state change notification corresponding to the execution of the second round of the collective control command is transmitted at the response time that is set as explained above. Therefore, the device control system can maintain almost a constant level of the communication load on the network NT caused by transmission of the state change notifications, and can further prevent the packet loss. The state change notification corresponding to the execution of the second round of the collective control command may be transmitted without performing the processing for generating the random number again, when the notification prohibition period passes.

Embodiment 4

Figure 8:
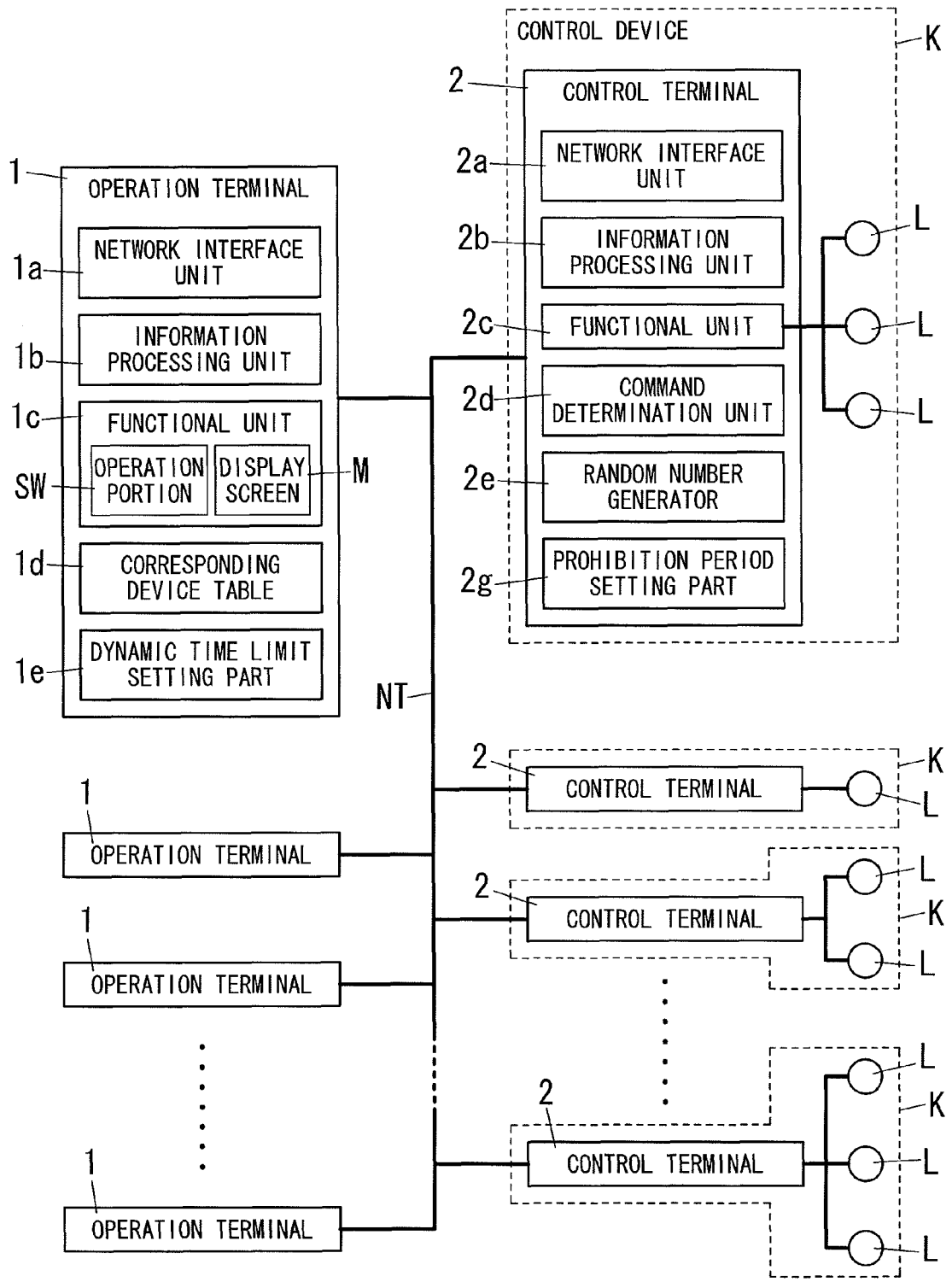
FIG. 8 is a diagram showing the configuration of a device control system according to Embodiment 4 of the present invention.
Figure 1C:
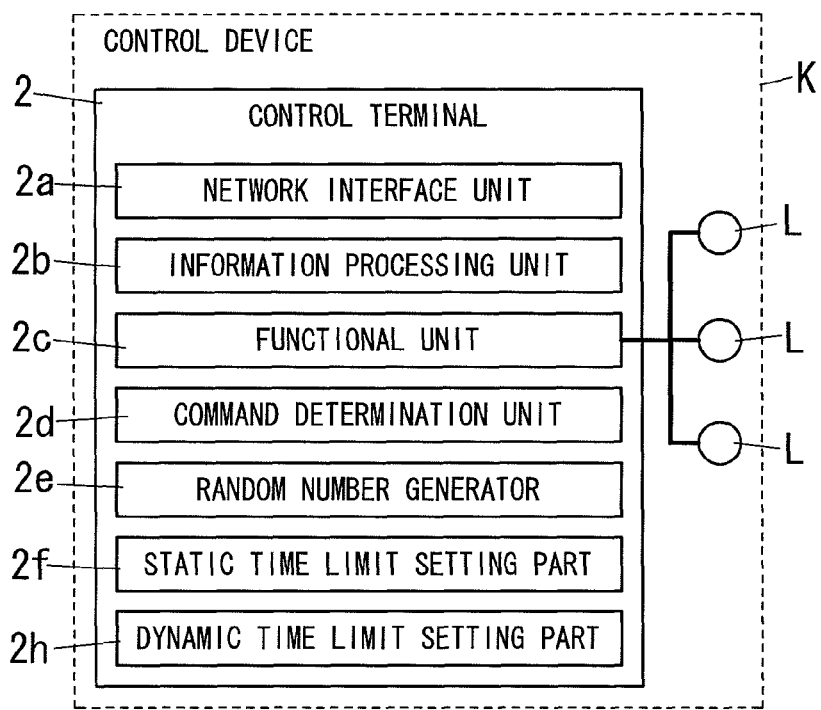

As shown in FIG. 8, in a device control system of the present embodiment, each operation terminal 1 is provided with a dynamic time limit setting part 1e. The constituent elements same as those of the Embodiment 3 are assigned with same reference numerals and the explanation thereof is omitted.

The dynamic time limit setting part 1e of each operation terminal 1 sets a dynamic time limit based on the number of control terminals 2 being objects of the collective control. The dynamic time limit is a permissible maximum time from when each control terminal 2 receives the collective control command till when responding by transmitting a state change notification, and is set based on the number of control terminals 2 being actual objects of the collective control.

Specifically, the dynamic time limit setting part 1e calculates the number of control terminals 2 being objects of the collective control, referring to terminal identifiers of control terminals 2 included in a parameter of a pattern control command (see FIG. 9A) that performs the collective control, or in a parameter of a group control command (see FIG. 9B) that performs the collective control. Here, when the control terminals 2 respond by collectively broadcasting state change notifications corresponding to the execution of the collective control command, with timings that are different from each other, the dynamic time limit setting part 2h sets, as the dynamic time limit into the collective control command, a time (or more) required for operation terminals 1 to receive all state change notifications transmitted by the control terminals 2. FIG. 9A shows a data structure of the pattern control command in which the dynamic time limit is set. FIG. 9B shows a data structure of the group control command in which the dynamic time limit is set. Further, the dynamic time limit setting part 1e has previously a corresponding table that makes the connection between the dynamic time limit and the number of control terminals 2 being objects of the collective control. The dynamic time limit setting part 1e sets the dynamic time limit, referring to the corresponding table.

When the collective control command is executed in control terminals 2, each of the control terminals 2 extracts the dynamic time limit from the collective control command received by the information processing unit 2b. Furthermore, the random number generator 2e generates a random number at a range of 0.0 to 1.0. The information processing unit 2b sets, to a response time, a value obtained by multiplying the random number by the dynamic time limit that has been extracted from the collective control command. That is, the dynamic time limit is set based on the number of control terminals 2 being objects of the collective control, and the response time is set randomly at a range of 0 to the dynamic time limit [sec].

Next, the information processing unit 2b starts checking time, and broadcasts collectively to all operation terminals 1 on the network NT, with a timing of when the time corresponds to the response time, the state change notification. That is, timings of when the state change notifications are broadcasted collectively by a plurality of control terminals 2 that have executed the collective control command are set randomly for each control terminal 2, and preferably are distributed uniformly in a range of 0 to the dynamic time limit [sec].

Therefore, even when the communication transport in the network NT is performed at low speed, the packet loss caused by the collision of the state change notifications transmitted in response to the broadcast of the control command is reduced. When obtaining the state change notification of a device(s) L from each of the control terminals 2 by broadcasting, each operation terminal 1 can receive the state change notification more certainly, and moreover a decrease in the communication efficiency can be prevented.

Further, the dynamic time limit is set and used based on the number of control terminals 2 being objects to be controlled through the collective control command, and therefore an optimum time limit is set for each collective control command, and the device control system can satisfy both of reliable receiving of the state change notification and securing of the communication efficiency optimally for each collective control command.

Then, each of operation terminals 1 on the network NT determines whether or not a device(s) L in which the control state has been changed is associated in its own corresponding device table 1d, when receiving the state change notification that has been broadcasted collectively. If determining that the device(s) L is associated in its own corresponding device table 1d, an operation terminal 1 updates the operating state display of the device(s) L in the display screen M based on the state change notification.

In addition, the controller 3 may be provided with the dynamic time limit setting part to transmit to each control terminal 2 the information of the dynamic time limit via the network NT.

Embodiment 5

As shown in FIG. 10, in a device control system of the present embodiment, each control terminal 2 is provided with both of a static time limit setting part 2f and a dynamic time limit setting part 2h. The constituent elements same as those of the Embodiments 1 and 3 are assigned with same reference numerals and the explanation thereof is omitted. Further, in the present embodiment, each control terminal 2 is not provided with a prohibition period setting part.

Figure 11A:
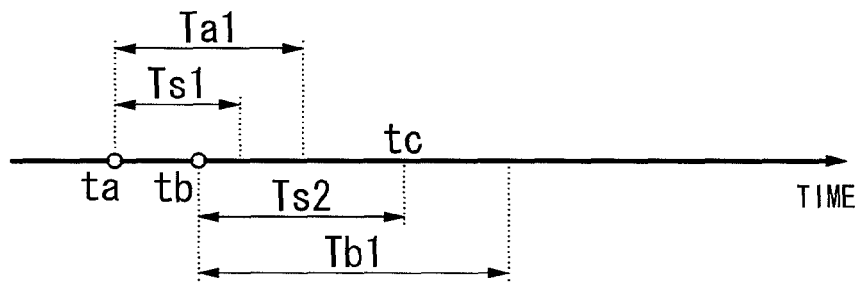
FIG. 11A is a diagram showing a communication processing with collectively broadcasting in the control terminal of the device control system according to the Embodiment 5 of the present invention.

As shown in FIG. 11A, when receiving a first round of a collective control command (a first collective control command) at a time ta, the information processing unit 2b sets a response time Ts1 for the first round of the collective control command, using a dynamic time limit Ta1 set by the dynamic time limit setting part 2h, like the Embodiment 3. That is, the response time Ts1 is set randomly in a range of 0 to the dynamic time limit Ta1 [sec], by means of using the dynamic time limit Ta1 that has been set based on the number of control terminals 2 being objects to be controlled through the collective control command.

Then, the information processing unit 2b performs the following processing, when receiving a second round of a collective control command (a second collective control command) (at a time tb) before the dynamic time limit Ta1 passes.

Here, if a response time for the second round of the collective control command is set using the dynamic time limit upon receiving the command, this causes the information processing unit 2b to generate state change notifications, including the first round of the reply, that exceed a predetermined amount during a certain time. Therefore, the chance of generating the packet loss is increased. So, the response time Ts2 for the second round of the collective control command is set using the static time limit Tb1 set by the static time limit setting part 2f, like the Embodiment 1. That is, by means of using the static time limit Tb1 set based on the number of control terminals 2 that are being connected to the network NT, the response time Ts2 is set randomly in a range of 0 to the static time limit Tb1 [sec].

Here, the static time limit Tb1 based on the number of control terminals 2 that are being connected to the network NT is easy to become longer than the dynamic time limit Ta1 based on the number of control terminals 2 being objects to be controlled through the collective control command. Therefore, even when transmitting the state change notification for the second round of the collective control command, the device control system can limit the communication traffic during the certain time to the predetermined amount or less. Further, if the static time limit Tb1 is set based on the maximum number of control terminals 2 that are connectable to the network NT, the time limit has a maximal length, and therefore, the device control system has the most depression effect on the communication traffic.

Figure 11B:
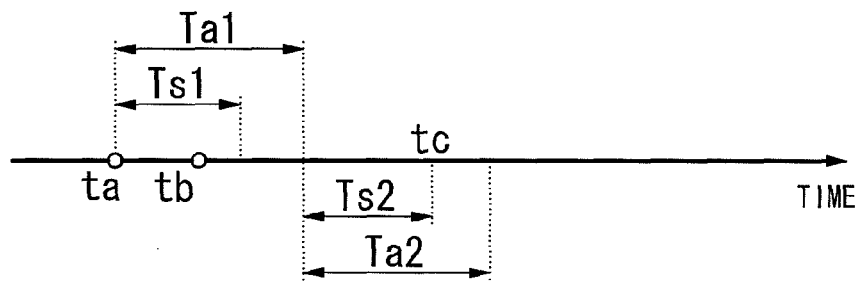
FIG. 11B is a diagram showing a communication processing with collectively broadcasting in the control terminal of the device control system according to the Embodiment 5 of the present invention.

Then, the information processing unit 2b may perform a processing shown in FIG. 11B, when receiving the second round of the collective control command (the second collective command) (at a time Tb) before the dynamic time limit Ta1 passes.

In this case, a response time Ts2 for the second round of the collective control command is set using a dynamic time limit Ta2 that begins at the end of the dynamic time limit Ta1 for the first round of the collective control command. That is, the response time Ts2 is set randomly in a range of 0 to the dynamic time limit Ta2 [sec], by means using the dynamic time limit Ta2 based on the number of control terminals 2 being objects to be controlled through the collective control command. Therefore, even when transmitting the state change notification for the second round of the collective control command, the device control system can limit the communication traffic during the certain time to the predetermined amount or less. In this case, the static time limit setting part 2f is not need, and the configuration can be simplified.

Further, the information processing unit 2b may use, as the response time Ts2 for the second round of the collective control command, a time limit having the earlier of reply times tc of the state change notification, in the static time limit Tb1 and the dynamic time limit Ta2. In this case, the depression effect on the communication traffic can be obtained, and the device control system can reflect effectively the change of the control state on display contents in all operation terminals 1 existing on the network NT.

Embodiment 6

As shown in FIG. 10, in a device control system of the present embodiment, each control terminal 2 is provided with both of a static time limit setting part 2f and a dynamic time limit setting part 2h. The constituent elements same as those of the Embodiments 1 and 3 are assigned with same reference numerals and the explanation thereof is omitted. Further, in the present embodiment, each control terminal 2 is not provided with a prohibition period setting part.

First, a collective control command includes a first collective control command or a second collective control command. The first collective control command is a command that enables the recognition of the number of control terminals 2 being objects to be controlled, by referring to terminal identifiers of control terminals 2 included in the command. The second collective command is a command that does not enable the recognition of the number of control terminals 2 being objects to be controlled.

For example, a pattern control command or a group control command, including a broadcast identifier in its own OID, is cited as the first collective control command that enables the recognition of the number of control terminals 2 being objects to be controlled (see FIGS. 2B and 2C). Further, for example, a single control command, including a broadcast identifier in its own OID, is cited as the second collective control command that does not enable the recognition of the number of control terminals 2 being objects to be controlled (see FIG. 2D).

Then, when receiving the first collective control command, the information processing unit 2b sets a response time for the first collective control command, using a dynamic time limit set by the dynamic time limit setting part 2h, like the Embodiment 3. That is, the response time is set randomly in a range of 0 to the dynamic time limit [sec], by means of using the dynamic time limit that has been set based on the number of control terminals 2 being objects to be controlled through the first collective control command.

Further, when receiving the second collective control command, the information processing unit 2b sets a response time for the second collective control command, using a static time limit set by the static time limit setting part 2f, like the Embodiment 1. That is, the response time is set randomly in a range of 0 to the static time limit [sec], by means of using the static time limit set based on the number of control terminals 2 that are being connected to the network NT.

In addition, the response time is set randomly in a range of 0 to the static time limit [sec] by means of using not the dynamic time limit but the static time limit, when receiving the first collective control command before the static time limit passes from the time when receiving the second collective control command. Accordingly, even when transmitting a state change notification for the first collective control command that comes next the second collective control command, the device control system can limit the communication traffic during the certain time to the predetermined amount or less.

Furthermore, in the abovementioned embodiments, the case where the communication transport in the network NT is performed at low speed is considered. Accordingly, the device control system is effective in using the communication transport in which simultaneous communication tolerance is low, regardless of the wire communication and wireless communication.

Although the present invention has been described with reference to certain preferred embodiments, numerous modifications and variations can be made by those skilled in the art without departing from the true spirit and scope of this invention, namely claims.

The invention claimed is:

1. A device control system comprising a plurality of operation terminals connected to a network and a plurality of control devices connected to the network, each operation terminal transmitting a control command to the plurality of control devices, each control device being controlled by executing the received control command and transmitting a state change notification to the plurality of operation terminals when a control state is changed by the execution of the control command, wherein each operation terminal is configured so as to transmit, as the control command, an individual control command that is transmitted individually to a specific control device of the plurality of control devices, or a collective control command that is broadcasted collectively to two or more control devices of the plurality of control devices, and wherein each control device comprise:

a command determination unit for determining whether the received control command is the individual control command or the collective control command; and an information processing unit which, if the received control command is the individual control command, responds by collectively broad-casting to the plurality of operation terminals a state change notification corresponding to the execution of the individual control command, and, if the received control command is the collective control command, responds by collectively broadcasting to the plurality of operation terminals, with a timing different from the other control devices, a state change notification corresponding to the execution of the collective control command.

2. The device control system according to claim 1, wherein the information processing unit of each control device determines the timing for transmitting the state change notification corresponding to the execution of the collective control command, based on a value that is equal to or more the number of the plurality of control devices that are being connected to the network, when receiving the collective control command.

3. The device control system according to claim 1, wherein the information processing unit of each control device determines the timing for transmitting the state change notification corresponding to the execution of the collective control command, based on a value of the maximum number of control devices that are connectable to the network, when receiving the collective control command.

4. The device control system according to claim 2, further comprising a static time limit setting part and a random number generator, wherein in the case where control devices, being equal to or more the number of the plurality of control devices that are being connected to the network, transmit, with timings that are different from each other, state change notifications corresponding to the execution of the collective control command, the static time limit setting part is configured to set, to a static time limit, a time or more required for the plurality of operation terminals to receive all state change notifications transmitted by the control devices, wherein the random number generator generates a random number for each control device, and wherein the information processing unit of each control device transmits, the state change notification, with the timing within the static time limit based on the random number generated by the random number generator, when receiving the collective control command.

5. The device control system according to claim 4,
wherein the static time limit is a permissible maximum time from when each control device receives the collective control command till when responding by transmitting the state change notification.

6. The device control system according to claim 2, further comprising a prohibition period setting part which is configured to set a notification prohibition period that is a period from when each control device transmits the state change notification till when the transmission of next state change notification is allowed, based on the number of the plurality of control devices that are being connected to the network, wherein the information processing unit of each control device is configured so as not to transmit the next state change notification before the notification prohibition period passes from the time when transmitting the state change notification.

7. The device control system according to claim 1,
wherein the information processing unit of each control device determines the timing for transmitting the state change notification corresponding to the execution of the collective control command, based on the number of the two or more control devices, being objects to be controlled, to which each operation terminal transmits the collective control command, when receiving the collective control command.

8. The device control system according to claim 7, further comprising a dynamic time limit setting part and a random number generator, wherein the dynamic time limit setting part is configured to set a dynamic time limit, based on the number of the two or more control devices, being objects to be controlled, to which each operation terminal transmits the collective control command, wherein the random number generator generates a random number for each control device, and wherein the information processing unit of each control device transmits, the state change notification, with the timing within the dynamic time limit based on the random number generated by the random number generator, when receiving the collective control command.

9. The device control system according to claim 7, further comprising a prohibition period setting part which is configured to set a notification prohibition period that is a period from when each control device transmits the state change notification till when the transmission of next state change notification is allowed, based on the number of the two or more control devices, being objects to be controlled, to which each operation terminal transmits the collective control command, wherein the information processing unit of each control device is configured so as not to transmit the next state change notification before the notification prohibition period passes from the time when transmitting the state change notification.

10. The device control system according to claim 4, further comprising a dynamic time limit setting part, which is configured to set a dynamic time limit, based on the number of the two or more control devices, being objects to be controlled, to which each operation terminal transmits the collective control command, wherein the collective control command includes a first collective control command or a second collective control command, and wherein the information processing unit of each control device is configured:

to transmit a state change notification corresponding to the execution of the first collective control command, with the timing within the dynamic time limit based on the random number generated by the random number generator, when receiving the first collective control command; and to transmit a state change notification corresponding to the execution of the second collective control command, with the timing within the static time limit based on the random number generated by the random number generator, when receiving the second collective control command before the dynamic time limit passes from the time when receiving the first collective control command.

11. The device control system according to claim 8,
wherein the collective control command includes a first collective control command or a second collective control command, and wherein the information processing unit of each control device is configured:

to transmit a state change notification corresponding to the execution of the first collective control command, with the timing within a first dynamic time limit based on the random number generated by the random number generator, when receiving the first collective control command; and to transmit a state change notification corresponding to the execution of the second collective control command, with the timing within a second dynamic time limit based on the random number generated by the random number generator after the first dynamic time limit passes, when receiving the second collective control command before the first dynamic time limit passes from the time when receiving the first collective control command.

12. The device control system according to claim 4, further comprising a dynamic time limit setting part, which is configured to set a dynamic time limit, based on the number of the two or more control devices, being objects to be controlled, to which each operation terminal transmits the collective control command, wherein the collective control command includes a first collective control command or a second collective control command, and wherein the information processing unit of each control device is configured:

to transmit a state change notification corresponding to the execution of the first collective control command, with the timing within a first dynamic time limit based on the random number generated by the random number generator, when receiving the first collective control command; and to transmit a state change notification corresponding to the execution of the second collective control command, with the earlier of the timing within the static time limit based on the random number generated by the random number generator or the timing within a second dynamic time limit based on the random number generated by the random number generator, when receiving the second collective control command before the first dynamic time limit passes from the time when receiving the first collective control command.

13. The device control system according to claim 4, wherein the collective control command includes a first collective control command which has information of the number of the two or more control devices being objects to be controlled, or a second collective control command which does not have information of the number of the two or more control devices being objects to be controlled, wherein the device control system further comprises a dynamic time limit setting part, which is configured to set a dynamic time limit, based on the number of the two or more control devices, being objects to be controlled, to which each operation terminal transmits the collective control command, wherein the information processing unit of each control device is configured:

to transmit a state change notification corresponding to the execution of the first collective control command, with the timing within the dynamic time limit based on the random number generated by the random number generator, when receiving the first collective control command;

to transmit a state change notification corresponding to the execution of the second collective control command, with the timing within the static time limit based on the random number generated by the random number generator, when receiving the second collective control command; and to transmit a state change notification corresponding to the execution of the first collective control command, with the timing within the static time limit based on the random number generated by the random number generator, when receiving the first collective control command before the static time limit passes from the time when receiving the second collective control command.

14. The device control system according to claim 4, further comprising a prohibition period setting part which is configured to set a notification prohibition period that is a period from when each control device transmits the state change notification till when the transmission of next state change notification is allowed, based on the number of the plurality of control devices that are being connected to the network, wherein the information processing unit of each control device is configured so as not to transmit the next state change notification before the notification prohibition period passes from the time when transmitting the state change notification.

15. The device control system according to claim 8, further comprising a prohibition period setting part which is configured to set a notification prohibition period that is a period from when each control device transmits the state change notification till when the transmission of next state change notification is allowed, based on the number of the two or more control devices, being objects to be controlled, to which each operation terminal transmits the collective control command, wherein the information processing unit of each control device is configured so as not to transmit the next state change notification before the notification prohibition period passes from the time when transmitting the state change notification.

* * * * *